(12) United States Patent
Campbell

(10) Patent No.: US 11,352,764 B2
(45) Date of Patent: Jun. 7, 2022

(54) ADVANCED FIBER ROPE BOOM PENDANT TECHNOLOGIES FOR HEAVY EQUIPMENT

(71) Applicant: Bright Technologies, LLC, Havana, FL (US)

(72) Inventor: Richard V. Campbell, Havana, FL (US)

(73) Assignee: Bright Technologies, LLC, Havana, FL (US)

( * ) Notice: Subject to any disclaimer, the term of this patent is extended or adjusted under 35 U.S.C. 154(b) by 247 days.

(21) Appl. No.: 16/296,284

(22) Filed: Mar. 8, 2019

(65) Prior Publication Data

US 2019/0368161 A1 Dec. 5, 2019

Related U.S. Application Data

(60) Provisional application No. 62/640,242, filed on Mar. 8, 2018.

(51) Int. Cl.
*E02F 3/48* (2006.01)
*E02F 3/58* (2006.01)
*E02F 3/60* (2006.01)
*E02F 9/14* (2006.01)

(52) U.S. Cl.
CPC ...................................... *E02F 9/14* (2013.01)

(58) Field of Classification Search
CPC ....... E02F 9/14; E02F 3/48; E02F 3/58; E02F 3/60; E02F 3/47; F16G 11/025; F16G 11/042

See application file for complete search history.

(56) References Cited

U.S. PATENT DOCUMENTS

| | | | | |
|---|---|---|---|---|
| 1,529,397 A * | 3/1925 | Burke | ..................... | E02F 3/304 414/690 |
| 1,933,472 A * | 10/1933 | De Vou | ................... | B66C 23/78 180/9.42 |
| 3,035,646 A * | 5/1962 | Johansson | ................. | E02D 7/16 212/87 |
| 4,085,854 A * | 4/1978 | Baron | ...................... | E02F 3/30 414/719 |
| 4,090,538 A * | 5/1978 | Kotcharian | ............. | B63B 21/50 137/236.1 |
| 5,427,469 A * | 6/1995 | Galarnyk | ................ | F16G 11/06 403/396 |
| 6,007,256 A * | 12/1999 | Asada | .................. | G02B 6/3869 385/71 |
| 6,113,039 A * | 9/2000 | Riffle | ....................... | B67D 7/04 248/62 |
| 2013/0110460 A1 * | 5/2013 | Taylor | ................... | E02F 9/2025 702/158 |
| 2013/0195595 A1 * | 8/2013 | Hottmann | ............. | E02F 9/2095 701/50 |
| 2015/0345105 A1 * | 12/2015 | Gross | ................... | E02F 3/4075 37/445 |
| 2017/0096793 A1 * | 4/2017 | Patenaude | ............... | E02F 3/427 |

(Continued)

*Primary Examiner* — Edwin J Toledo-Duran
(74) *Attorney, Agent, or Firm* — J. Wiley Horton

(57) ABSTRACT

A method and hardware for damping and controlling unwanted motion in the fixed rigging of large machines. In a first approach large clamp blocks are added to multi-cable rigging systems. These blocks use a first cable to damp the motion of an adjacent cable. The invention also encompasses adding armored sections to synthetic cables to enhance their abrasion resistance and cut resistance.

11 Claims, 11 Drawing Sheets

(56) References Cited

U.S. PATENT DOCUMENTS

2017/0233979 A1* 8/2017 Stalker .................. E02F 3/38
  414/727
2017/0350196 A1* 12/2017 Hoyvik ................ E21B 17/015

* cited by examiner

ADVANCED FIBER ROPE BOOM PENDANT TECHNOLOGIES FOR HEAVY EQUIPMENT

CROSS-REFERENCES TO RELATED APPLICATIONS

This non-provisional patent application claims the benefit of an earlier-filed provisional patent application. The provisional application was assigned Ser. No. 62/640,242. It listed the same inventor.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of tensile strength members used in the field of heavy lifting and digging equipment.

2. Description of the Related Art

The present invention is particularly suited to heavy lifting and digging equipment. It will benefit the reader's understanding to consider some exemplary machines in this field. FIG. 1 shows a prior art dragline crane 10. Cab 12 is mounted on walking shoes 32 that slowly move the machine from one location to the next. A turntable is provided so that the cab can swivel.

Boom 14 is pivotally mounted to the cab. It extends fir a large distance. For very large machines the boom may be as long as 100 meters. Mast 16 extends upward as shown. Multiple bridge support ropes 36 maintain the boom's position. A first group of bridge support ropes connects the top of mast 16 to the tip of boom 14. A second group of bridge support ropes 36 connect the top of mast 16 to A-frame 36 on the cab.

Bucket 18 actually does the digging and scooping. The weight of the bucket (and its contents) is supported by hoist rope 20. Hoist rope 20 passes over point sheave 22 and back to hoist drum 28 within the cab. Deflection sheaves 24, 26 redirect the path of the hoist rope as needed. Dragline rope pulls the bucket toward the cab. It is reeled in and paid out by hoist drum 28.

Bridge support ropes 36 are conventionally thought of as "fixed" or "standing" rigging in that they are not reeled in and paid out (in this context such a tension member will be referred to generally as a "stay"). This does not mean, however, that they are not subjected to dynamic forces. As hoist rope 20 is reeled in to lift the bucket, the tension on bridge support ropes 36 increases substantially. Once the scooping phase id own, the entire crane pivots to the dumping area. This swinging motion places lateral loads on the bridge support ropes. When the bucket is dumped the load on the bridge support ropes is suddenly and significantly reduced.

In these various motions the boom tends to bounce and sway. Bridge support ropes 36 undergo bouncing motions constantly. In some instances they will experience circular as well as lateral oscillations. The motions are best visualized as waves. Principles of superposition can produce violent motion in some instances. These violent motions are difficult to predict.

FIG. 2 shows another type of heavy equipment—power shovel 40. While smaller than the largest dragline cranes, a power shovel is still quite large. A large unit will have a height of 20 meters. In the example of FIG. 2, cab 44 rests on a pair of tracks 46. A turntable allows the cab to pivot with respect to the tracks. Boom 45 is pivotally attached to cab 44. Stays 50 are a set of fixed cables that connect the upper portion of boom 45 to A-frame 34 on the cab.

Hoist ropes 20 pass over point sheave 22 and back to a drum in the cab. The hoist ropes are attached to yoke 48. The yoke lifts the forward portion of dipper 42 during each loading cycle. A pair of dipper arms 46 also support dipper 42. Each dipper arm 46 is attached to boom 45 by a pinion assembly 52. As those skilled in the art will know, pinion assembly 52 creates a rack-and-pinion engagement between each dipper arm and the boom (as opposed to a simple pivot joint). When the dipper is lifted, the rack-and-pinion engagement propels the dipper forward. The result is a combined motion where the digging teeth on the bottom lip of the dipper move forward and upward. In more recent designs the forward motion may be produced by a large hydraulic cylinder rather than a rack-and-pinion engagement.

As for the dragline crane, the fixed rigging on the power shovel is not really fixed. The stays 50 bounce and move as the machine operates. There are some problems unique to power shovels. The reader will note how the rear extreme of each dipper arm 46 passes close to a stay 50. The stays may move in a lateral wave and may also move in a circular wave (a jump rope-type motion). In extreme cases the rear of a dipper arm can collide with a stay.

Another problem known for power shovels is the fact that the dipper arms can sometimes lift the boom. This is sometimes referred to as "boom jacking." If the dipper lodges in a resistant piece of earth and stops the momentum of the stroke may pull the dipper arms forward and pivot the boom upward (with the dipper becoming a temporary fulcrum). This motion temporarily unloads stays 50. Shortly after the stays go slack the dipper will break free and the boom will fall downward until the stays are tight again. The result is a tremendous shock load. This shock load produces extreme cyclic motion in the stays. The motion will dampen over time but damage is possible in the interim.

The fixed rigging for these types of heavy machines has traditionally been made from heavy wire rope. Wire rope is quite tough. It is also capable of repeated elastic deformation without significant damage. Wire rope also provides good damping characteristics. The steel wires making up the rope provide reasonable damping. In addition, as most wire ropes are helically laid, the layered helices themselves provide good damping characteristics by twisting and untwisting.

High-strength synthetic filaments offer potential advantages over the use of wire rope. These filaments have a much higher strength-to-weight ratio. If one can reduce the weight of the cable rigging in a large earth moving machine, the weight saving translates directly into additional payload. There is therefore a real incentive to use advanced synthetic filaments instead of steel wire in a tensile strength member in a large piece of equipment.

A tensile strength members must be connected to other components in order to be useful. For example, a cable used in a hoist generally includes a lifting hook on its free end. This lifting hook may be rigged to a load. The assembly of an end-fitting and the portion of the cable to which it is attached is generally called a "termination."

A tough steel lifting hook is commonly attached to a wire rope to create a termination. A "spelter socket" is often used to create the termination. The "spelter socket" involves an expanding cavity within the end-fitting. A length of the wire rope is slipped into this cavity and the individual wires are splayed apart. A liquid potting compound is then introduced into the expanding cavity with the wires in place. The liquid potting compound transitions to a solid over time and thereby locks the wire rope into the cavity.

The potting compound used in a spelter socket is traditionally molten lead and—more recently—is more likely a high-strength epoxy. However, the term "potting compound" as used in this description means any substance which transitions from a liquid to a solid over time. Examples include molten lead, thermoplastics, and UV-cure or thermoset resins (such as two-part polyesters or epoxies). Other examples include plasters, ceramics, and cements. The term "solid" is by no means limited to an ordered crystalline structure such as found in most metals. In the context of this invention, the term "solid" means a state in which the material does not flow significantly under the influence of gravity. Thus, a soft but stable wax is yet another example of such a solid.

The prior art approaches to adding a termination to a cable are explained in detail in commonly-owned U.S. Pat. Nos. 7,237,336; 8,048,357; 8,236,219 and 8,371,015. These prior patents are hereby incorporated by reference. The prior art approaches are also explained in detail in commonly-owned U.S. patent application Ser. Nos. 13/678,664 and 15/710,692. These published pending applications are also hereby incorporated by reference.

Many different high-strength synthetic filaments are now known. Examples include DYNEEMA (ultra-high-molecular-weight polyethylene), SPECTRA (ultra-high-molecular-weight polyethylene), TECHNORA (aramid), TWARON (p-phenylene terephthalamide), KEVLAR (para-aramid synthetic fiber), VECTRAN (a fiber spun from liquid-crystal polymer), PB (poly(p-phenylene-2,6-benzobisoxazole)), carbon fiber, and glass fiber (among many others). In general the individual filaments have a thickness that is less than that of human hair. The filaments are very strong in tension, but they are not very rigid and they are not very tough. They offer potential weight savings over traditional wire rope but they also require additional methodologies and hardware to allow them to survive in a hostile environment such as a pit mine.

Tensile members made predominantly from synthetic filaments are very strong in tension but weak in abrasion resistance, cut resistance, and transverse shear resistance (The word "predominantly" is used because it is known to provide hybrid cables that include both metallic components and synthetic components). This invention disclosure describes hardware and methods that are useful in adapting tensile strength members including synthetic filaments to a harsh environment. The hardware and methods are primarily directed toward synthetic cables, but the reader should bear in mind that these techniques are advantageous for traditional wire ropes in some circumstances as well.

BRIEF SUMMARY OF THE PRESENT INVENTION

The present invention comprises a method and hardware for damping and controlling unwanted motion in the fixed rigging of large machines. In a first approach large clamp blocks are added to multi-cable rigging systems. These blocks use a first cable to damp the motion of an adjacent cable. The invention also encompasses adding armored sections to synthetic cables to enhance their abrasion resistance and cut resistance.

Figure 1:
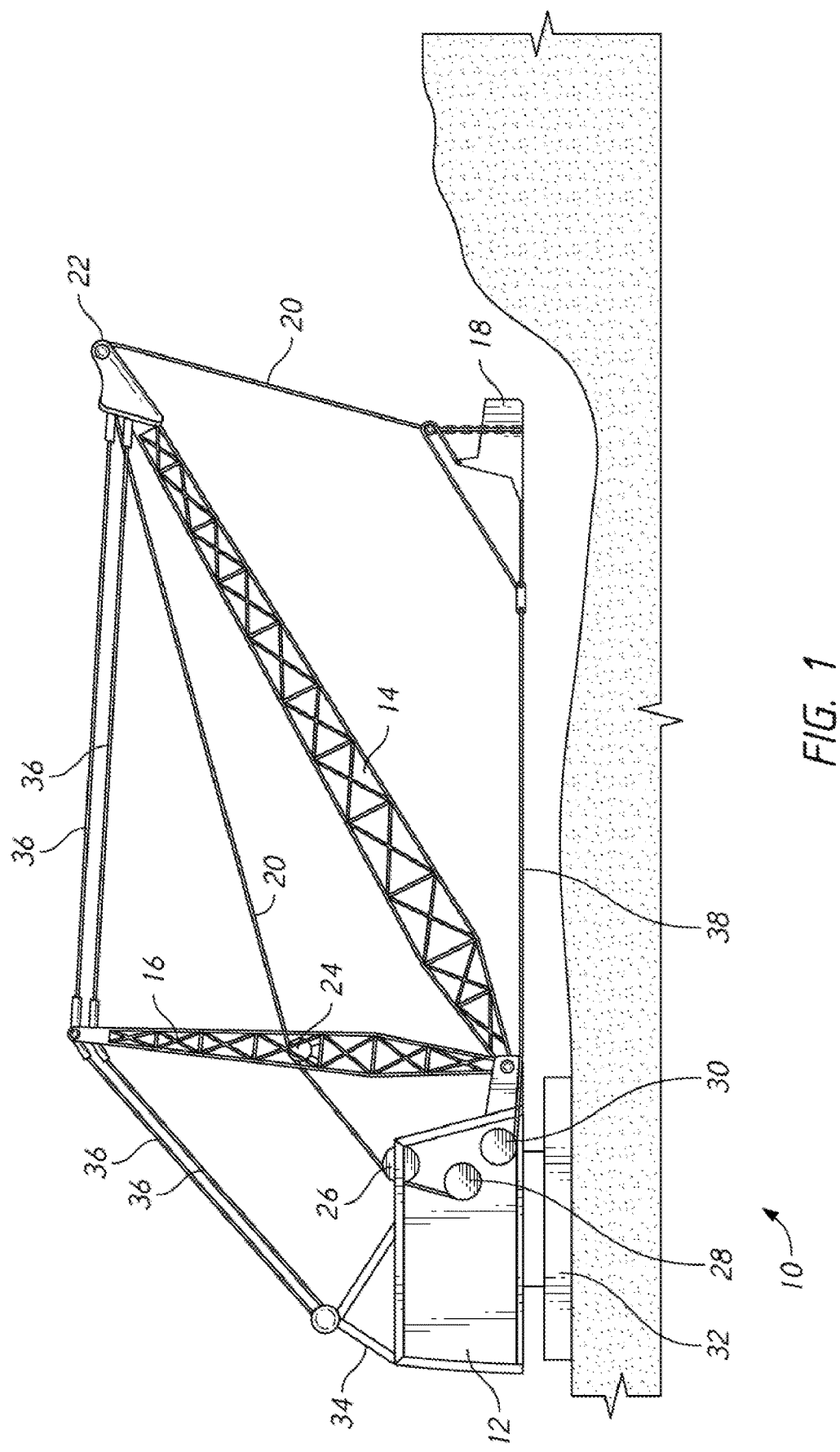
FIG. 1 is an elevation view, showing a prior art dragline crane.
Figure 2:
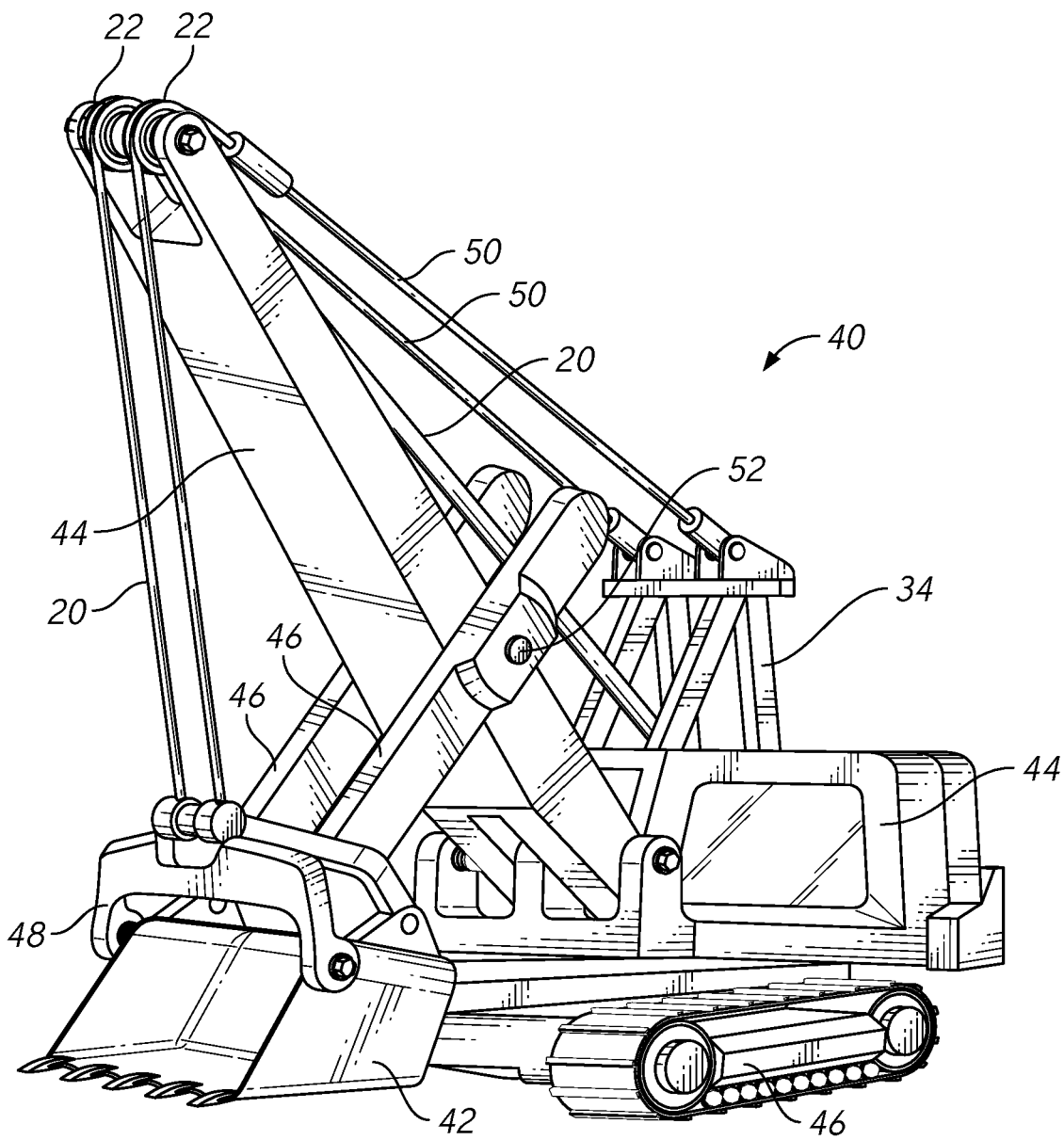
FIG. 2 is a perspective view, showing a prior art linear tensile member (a cable) and a prior art end fitting (an anchor).

REFERENCE NUMERALS IN THE DRAWINGS 10 dragline crane
12 cab
14 boom
16 mast
18 bucket
20 hoist rope
22 point sheave
23 attachment features
24 deflection sheave
26 deflection sheave
28 hoist drum
30 dragline drum
32 shoe
34 A-frame
36 bridge support rope
38 dragline rope
40 power shovel
42 dipper
44 cab
45 boom
46 dipper arm
48 yoke
50 stay
52 pinion assembly
54 termination
56 bend restrictor
58 anchor
60 strand
62 collector 104 jacket clamp
106 bend restrictor half
108 mounting hole
110 threaded receiver
112 clamp receiver
114 bolt
116 inspection region
118 bolt flange
118 jacket
120 band clamp
124 flange
126 receiver
128 cable
130 end clamp block
132 intermediate clamp block
134 pillow
136 armoring
138 clamp
140 unified damping block
142 block
144 block
146 damper

DETAILED DESCRIPTION OF THE INVENTION

Figure 3:
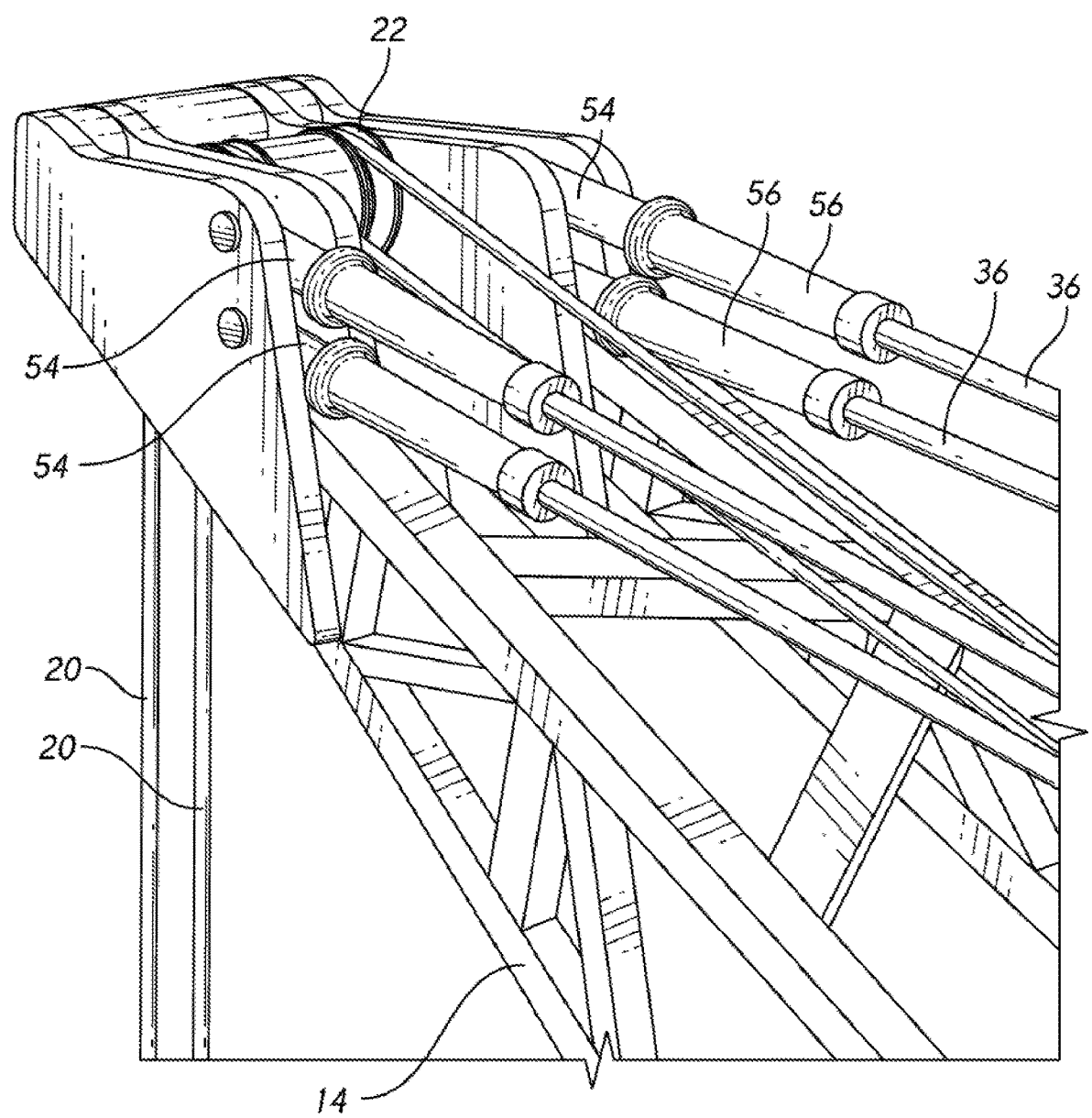
FIG. 3 is a perspective view, showing the point sheave area of the dragline crane of FIG. 1.

FIG. 3 shows a detailed view of a particular area of the prior dragline crane shown in FIG. 1. The view centers on the area of point sheave 22—located near the very tip of boom 14. In this example four separate bridge support ropes 36 carry the weight of the boom and the loads imposed by hoist ropes 20 (which raise and lower the bucket). The term "rope" is a traditional term used within the heavy equipment industry. In this context the term rope is a synonym fir a cable or any other term referring to a tensile strength member.

Each bridge support rope is made primarily (if not fully) from high-strength synthetic filaments. Each of the four bridge support ropes ends in a termination 54. Each termination in this example is connected to the boom by a large transverse pin. Bend restrictors 56 provide a transition between the freely flexing portion of the rope and the portion that is rigidly locked within the termination. In this example, each bend restrictor 56 is approximately 3 meters long. The forces involved in such an assembly are tremendous.

Figure 4:
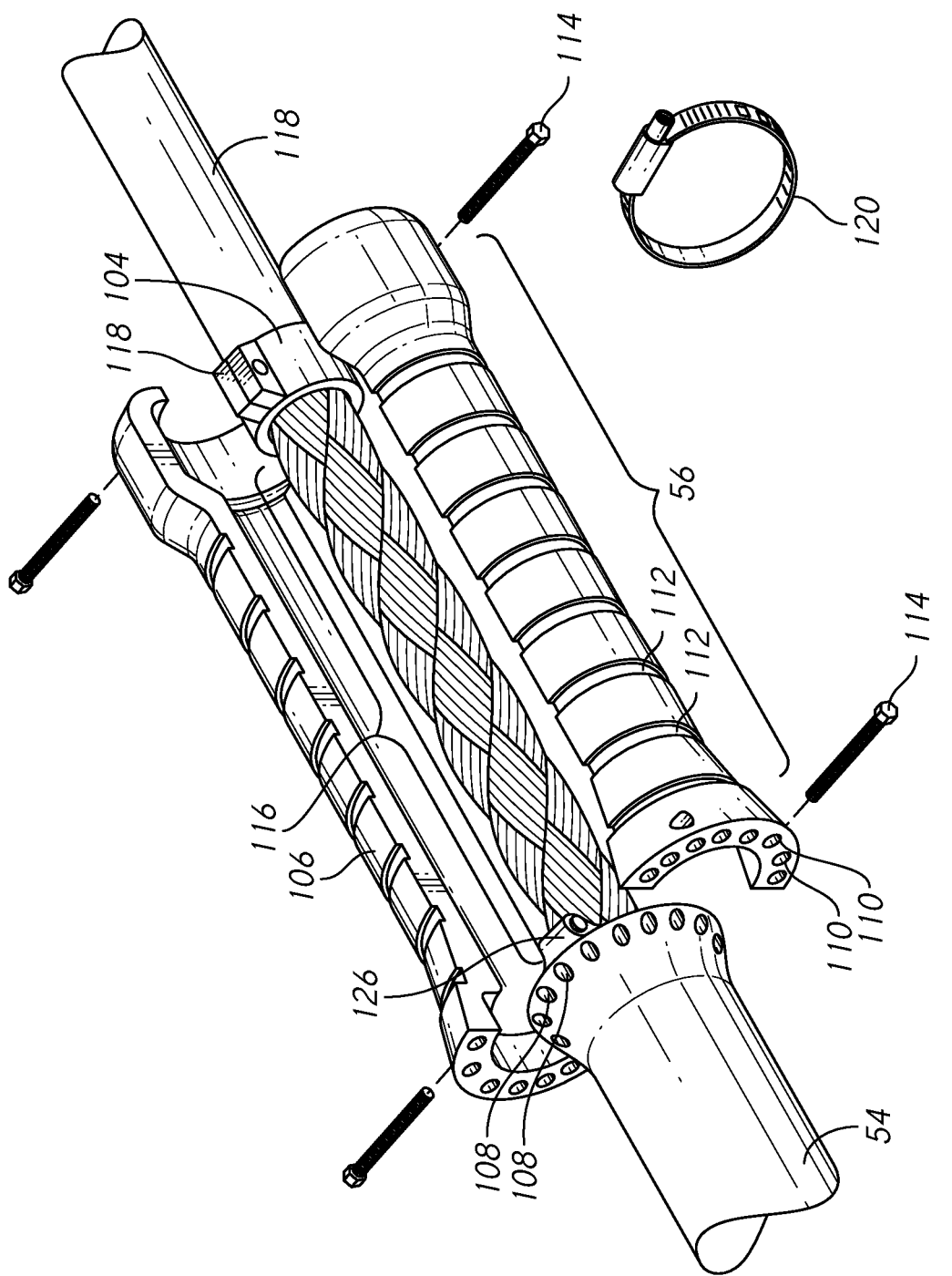
FIG. 4 is an exploded perspective view, showing some typical hardware used in the vicinity of a termination.

FIG. 4 provides additional details concerning the cables, the terminations, and the bend restrictors employed. In the state shown in FIG. 7, inspection region 116 of the cable is fully accessible. The strands and filaments themselves are accessible, as jacket 28 (a protective sleeve covering the cable) stops at jacket clamp 104. The inspection process will be described after more details of the mechanical assembly are described.

Figure 7:
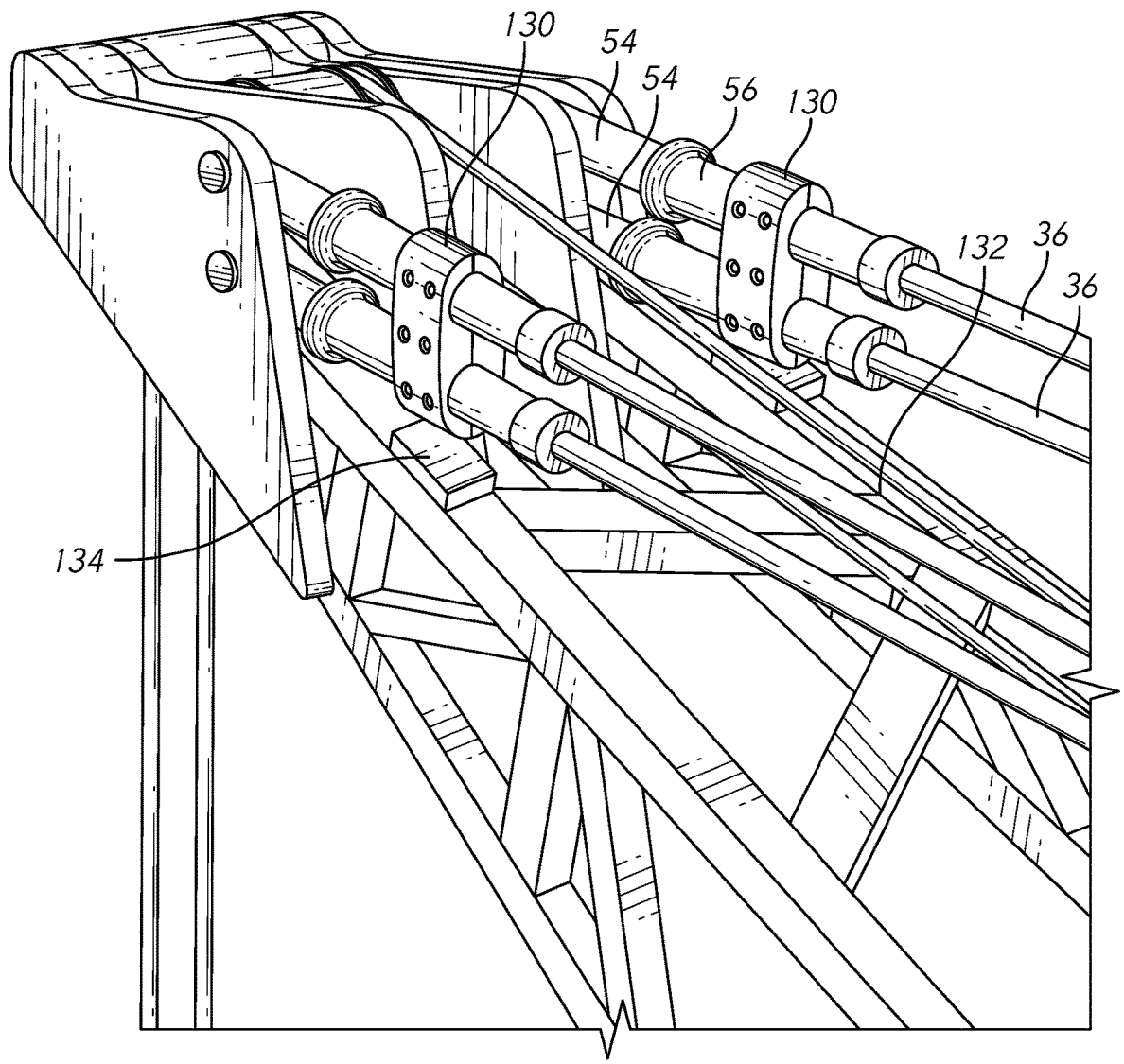
FIG. 7 is a perspective view, showing the use of clamp blocks and pillows in a bridge support rope system on a dragline crane.

In order to reassemble the exploded assembly depicted in FIG. 7, the user may start by urging the two bend restrictor halves 106 together (The word "may" is used because more than one order of assembly is possible). The user then inserts the four transverse bolts 114. Each bolt 114 passes through a hole in one bend restrictor half and threads into a threaded receiver in the opposite bend restrictor half. The hole in each restrictor half includes a counterbore with a bearing face. The head of each bolt bears against the bearing face of a counterbore as the bolt is tightened—thereby pulling the two bend restrictor halves together.

The two bend restrictor halves are properly positioned with respect to termination 54 by that face that the bolts 114 slide through bolt receiver 126 on the termination and bolt flange 118 on jacket clamp 104. A stronger connection between the termination and the bend restrictor is preferred, however. To that end, numerous bolts are passed through mounting holes 108 in the termination and into threaded receivers 110 on the bend restrictor halves. These bolts create a very strong flange-type connection.

The two bend restrictor halves are preferably made of a very tough yet somewhat elastic material. In the embodiment shown, the two halves are made of molded urethane. While urethane is indeed a tough material, the reader should bear in mind that the tension on the cable will often be enormous and the lateral flexure loads are also quite substantial. These loads will tend to buckle and separate the two bend restrictor halves.

In order to strengthen the assembly, a series of clamp receivers 112 are provided on the exterior surface of the bend restrictor halves. Each clamp receiver is a groove having a rectangular cross section. Once the two halves are united, a band clamp 120 is opened, passed around the two halves, and secured in each clamp receiver. The example shown provides enough receivers to accommodate eight band clamps 120. Once these band clamps are tightened, the assembly becomes much stronger.

The tightened assembly is placed in service and remains in service for a defined interval. Once the interval is completed, the bend restrictor must be opened to facilitate inspection of the cable. The band clamps are removed and the two bend restrictor halves are disassembled. Inspection region 116 is thereby exposed.

Figure 5:
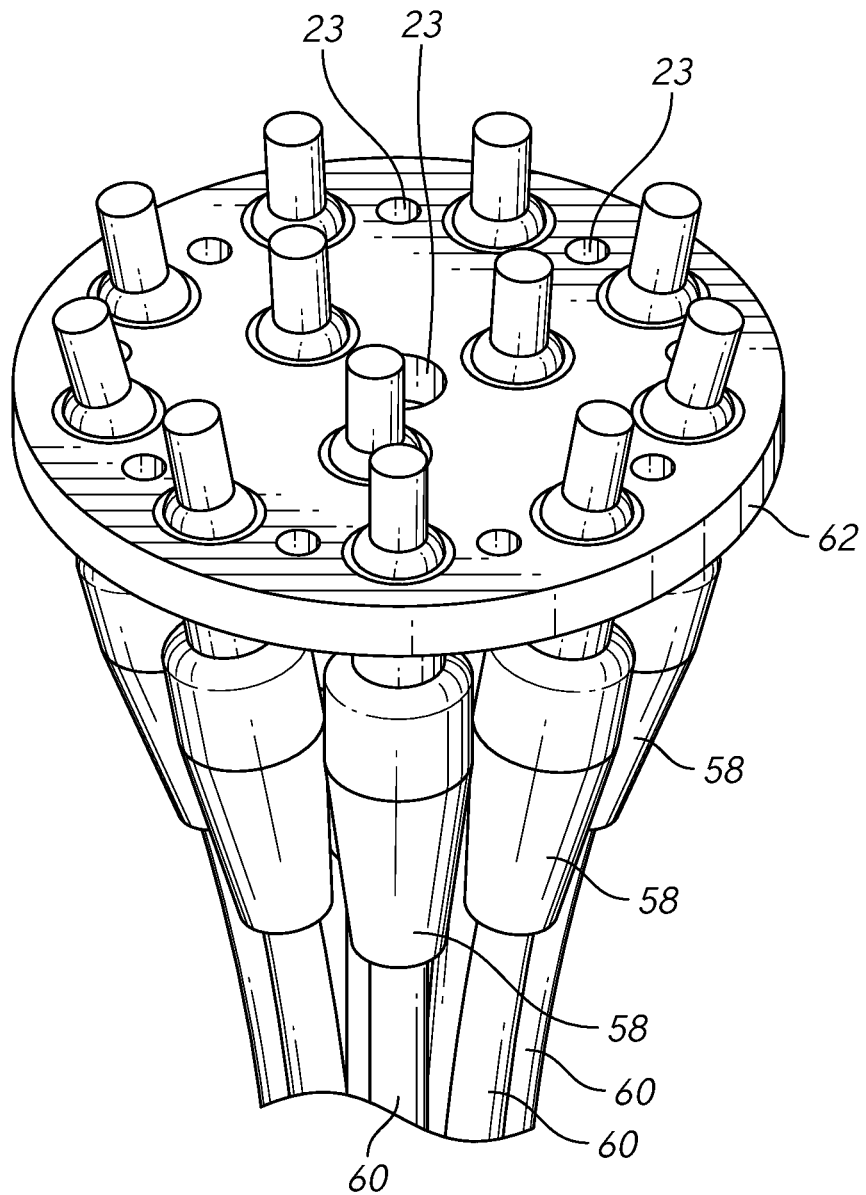
FIG. 5 is a perspective view, showing a simplified depiction of a collector used in a termination of a multi-stranded cable.
Figure 6:
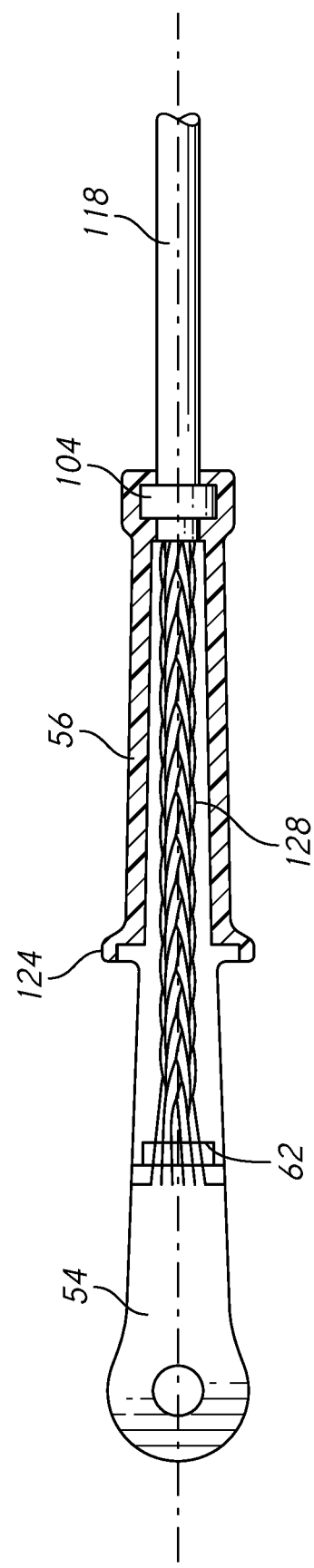
FIG. 6 is a sectional elevation view, showing the use of a collector in a termination of a multi-stranded cable.

The cable itself is made of several individual strands that are braided, woven, or twisted together. A braided example is shown. Termination 54 includes a fairly complex assembly. FIG. 5 shows a perspective view of one of the internal components. An anchor 58 is attached to the end of each individual strand 60 in the cable (such as by potting). Each anchor is then attached to collector 62 using an attachment feature 23. FIG. 6 shows a sectional elevation view through termination 54 (in a simplified form). Collector 62 is mounted within the body of the termination. All the individual cable strands are connected to the collector. The collector is secured within a larger structure (in this case a loading eye that is used to connect to a transverse pin). Bend restrictor 56 attaches to the termination at flange 124. Jacket 118 extends in this example all the way to bend restrictor 56.

FIG. 7 shows some of the inventive hardware in use on a dragline crane such as illustrated in FIGS. 1 and 3. End clamp blocks 130 are used to join the left and right pairs of bridge support ropes 36. In this example each end clamp block is a made from a pair of pieces of molded urethane that includes a recess for the body of the bend restrictor passing through it. Six transverse bolts are used to clamp each half of a particular end clamp block 130 to its opposing mate.

The lateral or circular wave motion of each particular bridge support rope 36 will be transmitted to the adjoining bridge support rope and this will tend to prove rope-to-rope damping (Even though the motion of neighboring ropes may be similar, it will not tend to be in phase).

Intermediate clamp block 132 is a similar structure to end clamp block 130, but it is placed at some intermediate point of the rope. Intermediate clamp block 132 is shown near the boom tip in FIG. 7 in order to illustrate this type of clamp block in the same view as end clamp block 130. However, the intermediate clamp block may be placed far from the tip. In fact, several such clamp blocks 132 may be placed along the bridge support ropes in the span between the boom tip and the mast (as well as between the mast and the A-frame).

Pillow 134 is a cushion of material added between the cable and the boom itself. As an example, a thick block of HDPE may be added in this location to cushion the "slap" caused by the bridge support topes going slack for a brief interval.

Figure 8:
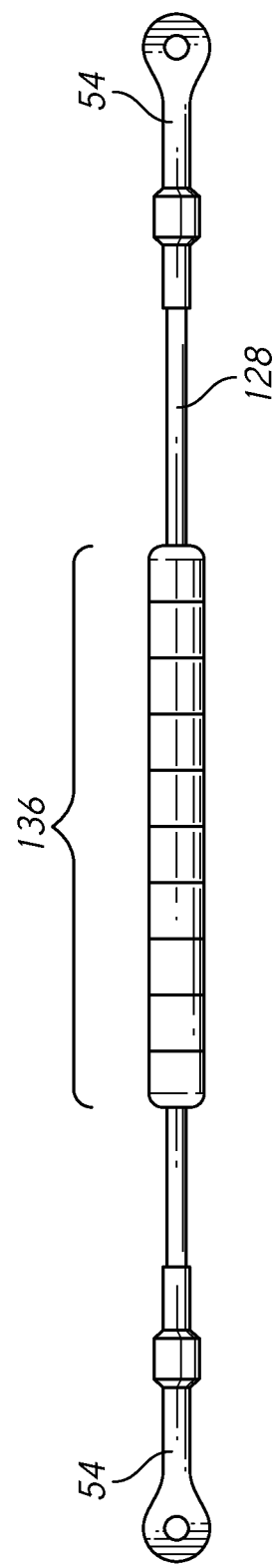
FIG. 8 is an elevation view, showing a length of armoring added to a middle portion of a cable.
Figure 9:
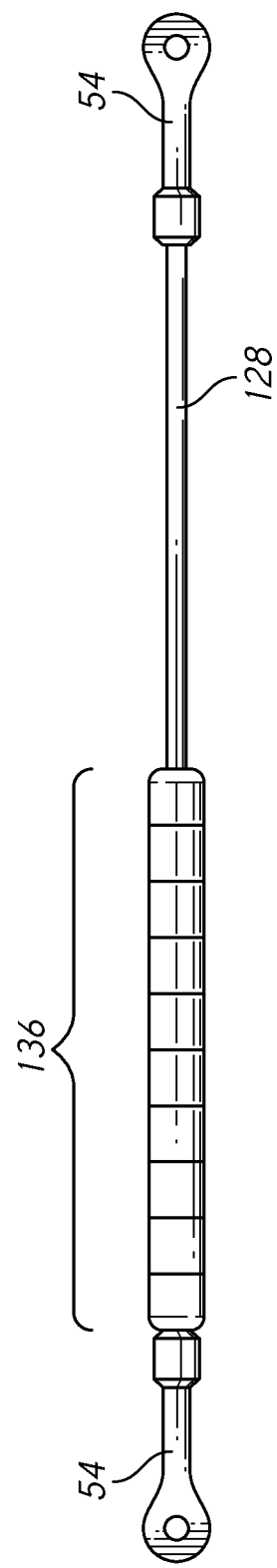
FIG. 9 is an elevation view, showing a length of armoring added to an end portion of a cable.
Figure 10:
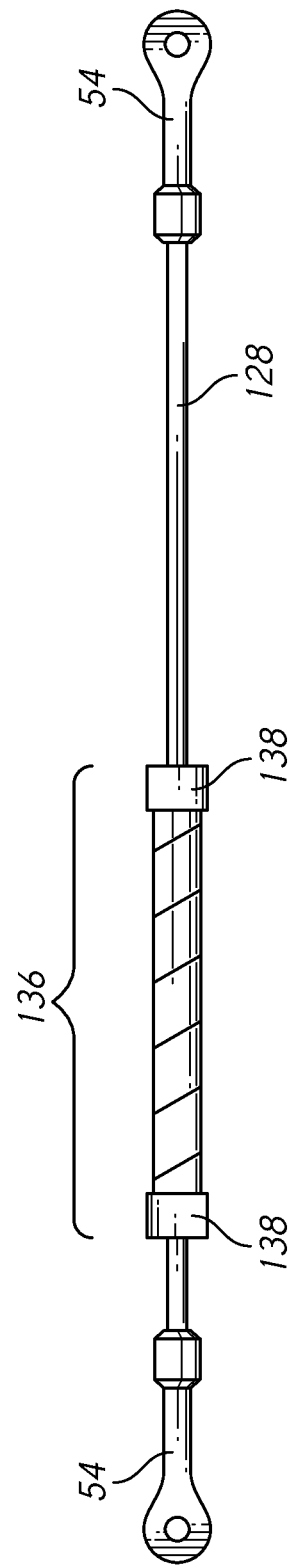
FIG. 10 is an elevation view, showing a length of armoring added to a middle portion of a cable and secured with a pair of clamps.

Cables used on heavy machinery must endure a very hostile environment. Flying rock and gravel tends to hit the cables. Such debris can often be pinched between the cable and the sheaves. In order to increase the working life of synthetic cables in such an environment, it is desirable to add an armoring layer. FIGS. 8-10 illustrate the addition of such armoring layers. FIG. 8 shows a cable 128 having a termination 54 on each end. Armoring 136 is added to an intermediate portion of this cable.

FIG. 9 shows a second example in which armoring 136 has been added to one end of cable 128. FIG. 10 shows a third example in which clamps 138 are used to secure the armoring to the cable.

The synthetic cables used for the inventive embodiments will preferably:

1. Utilize high modulus synthetics (such as DYNEEMA and VECTRAN) or medium modulus synthetics (such as NYLON, polyester, and KURALON).
2. Utilize helically wound, woven, r braided construction to maximize compliance for shock loading. This type of construction is also bend resistant. A good example is a high helix 12 strand braid.
3. Utilize coatings to provide lubrication and/or further seal the rope against harmful debris.
4. Use jackets around each of the individual strands (sub-ropes).
5. Cover the cable as a whole with a single or multi-layer jacket that allows staged visual indication of wear.

For demanding application—such as a pit mine—armoring is desirable in the contact regions. For something like a dragline crane, armoring will be needed in the regions near the bucket. The armoring material is preferably field replaceable as a wear component. The replacement could be done as a result of damage or as an ordinary wear item. The armoring may be free to rotate with respect to the rope, or it may be fixed to the rope.

Looking again at the example of FIG. 8, the armoring may be stitched to the cable strands over its length. The stitching would not provide significant tensile strength but would instead serve to hold the armoring in position so that it would not migrate along the length of the cable.

A second armoring example would be a tightly woven synthetic sleeve (such as KEVLAR). In this example frictional engagement alone could suffice to hold the armoring over the desired section of the cable. The armoring could also be a solid tube or a series of tube/bead bumper structured that are designed to roll as an external object (such as the dipper arms of a power shovel) impacts the cable.

A single cable might also include two separate lengths of armoring with a gap in between. The armoring could even be a two piece assembly that is clamped over the cable.

Figure 11:
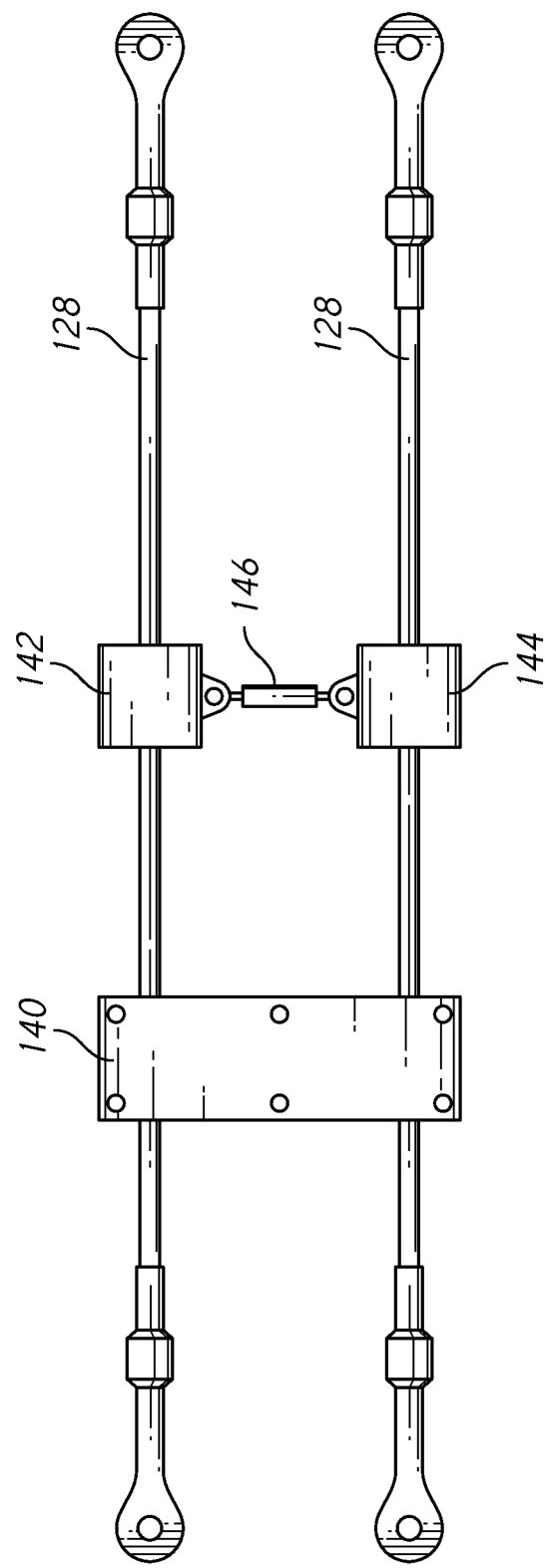
FIG. 11 is an elevation view, showing two different approaches to providing cable-to-cable damping.

FIG. 11 shows two additional types of dampening elements. Unified damping block 140 spans two cables and restricts the relative motion of one cable with respect to the other. A somewhat flexible material may be used—such as molded urethane. An even more flexible approach is shown on the right side of FIG. 11. In this example, separate blocks 142, 144 are clamped to each individual cable. A damper 146 is then connected between the two blocks 142, 144. The damper can be a complex device such as a large oil-filled shock absorber. The damper may even be an active device. The damper could be a double-acting hydraulic cylinder with computer-controlled pressure being fed to each side of the piston. Such a system could analyze the wave form being seen in the pendant ropes and command an opposing wave to be applied through damper 146.

The use of position and/or motion sensors along the length of each rope could provide information needed by a control system. The control system would then analyze the motion present and control one or more active dampers to reduce and control the unwanted motion. The use of such sensors is disclosed in detail in commonly owned application Ser. No. 16/255,913. This pending application is hereby incorporated by reference.

Although the preceding description contains significant detail, it should not be construed as limiting the scope of the invention but rather as providing illustrations of the preferred embodiments of the invention. Those skilled in the art will be able to devise many other embodiments that carry out the present invention. Thus, the language used in the claims shall define the invention rather than the specific embodiments provided.

Having described my invention, I claim:

1. A cable stabilizing system for heavy machinery, comprising:
   a. a cab;
   b. a boom connected to said cab, said boom having a point sheave on a distal end of said boom;
   c. a first stay having a first end connected to said cab and a second end connected to said boom proximate said point sheave, wherein first stay supports said boom;
   d. a second stay laterally offset from said first stay, said second stay having a first end connected to said cab and a second end connected to said boom proximate said point sheave, wherein said second stay supports said boom;
   e. a first bend restrictor attached to said first stay proximate said second end of said first stay;
   f. a second bend restrictor attached to said second stay proximate said second end of said second stay;
   g. a clamp block connecting said first stay to said second stay, said clamp block configured to damp motion of said second stay with respect to said first stay;
   h. wherein a first end of said clamp block is attached to said first bend restrictor; and
   i. wherein a second end of said clamp block is attached to said second bend restrictor.

2. The cable stabilizing system as recited in claim 1, wherein said clamp block comprises two halves that are clamped together around said first and second bend restrictors.

3. The cable stabilizing system as recited in claim 1, wherein said clamp block is located proximate an end of said first stay.

4. The cable stabilizing system as recited in claim 3, further comprising an intermediate clamp block connecting said first and second stays, wherein said intermediate clamp block is at an intermediate point along said first stay.

5. The cable stabilizing system as recited in claim 1, comprising:
   a. wherein said clamp block is divided into a first block connected to said first stay and a second block connected to said second stay; and
   b. a damper connecting said first and second blocks.

6. The cable stabilizing system as recited in claim 5, wherein said damper is an active damper.

7. A cable stabilizing system for heavy machinery, comprising:
   a. a boom having a distal end;

b. a first stay supporting said boom and being attached to said boom proximate said distal end;
c. a second stay supporting said boom and being attached to said boom proximate said distal end, said second stay being laterally offset from said first stay;
d. a first bend restrictor attached to said first stay proximate said distal end of said boom;
e. a second bend restrictor attached to said second stay proximate said distal end of said boom;
f. a clamp block connecting said first stay to said second stay;
g. wherein a first end of said clamp block is attached to said first bend restrictor;
h. wherein a second end of said clamp block is attached to said second bend restrictor; and said clamp block being configured to damp motion of said second stay with respect to said first stay.

8. The cable stabilizing system as recited in claim 7, wherein said clamp block comprises two halves that are clamped together around said first and second bend restrictors.

9. The cable stabilizing system as recited in claim 7, further comprising an intermediate clamp block connecting said first and second stays, wherein said intermediate clamp block is at an intermediate point along said first stay.

10. The cable stabilizing system as recited in claim 7, comprising:
a. wherein said clamp block is divided into a first block connected to said first stay and a second block connected to said second stay; and
b. a damper connecting said first and second blocks.

11. The cable stabilizing system as recited in claim 10, wherein said damper is an active damper.

\* \* \* \* \*